United States Patent [19]

Spiroch et al.

[11] 3,746,180

[45] July 17, 1973

[54] DEVICE FOR FACILITATING THE STORAGE OF MAGNETIC TAPE CASSETTTES

[75] Inventors: Franz N. Spiroch, Coburg; Karl Heinz Schmuck, Rumbeck, both of Germany

[73] Assignee: Eichner Organisation, Coburg, Germany

[22] Filed: June 3, 1971

[21] Appl. No.: 149,663

[30] Foreign Application Priority Data

June 4, 1970 Germany .................. P 20 27 379.4

[52] U.S. Cl. .................... 211/113, 211/41, 312/184

[51] Int. Cl. ............................................. A47f 5/00

[58] Field of Search ...................... 211/113, 124, 41, 211/162, 123, 46, 45, 50; 224/42.46 R, 42.46 A, 25 R; 206/DIG. 36, 45.14, 45.15, 44 R; 312/20, 184; 248/318, 317

[56] References Cited

UNITED STATES PATENTS

| | | | |
|---|---|---|---|
| 3,244,179 | 5/1966 | Porteous et al. | 211/162 |
| 3,452,878 | 7/1969 | Smith | 211/41 |

FOREIGN PATENTS OR APPLICATIONS

| | | | |
|---|---|---|---|
| 918,675 | 2/1963 | Great Britain | 312/184 |
| 359,117 | 2/1962 | Switzerland | 312/184 |
| 402,815 | 5/1966 | Switzerland | 312/184 |

*Primary Examiner*—Ramon S. Britts
*Attorney*—Williamson, Palmatier & Bains

[57] ABSTRACT

A device for facilitating the storage of magnetic tape cassettes comprises an elongate plastic rail of generally U-shaped cross-sectional configuration. The panels of each rail grip the sides of the cassette and portions of each rail extend beyond the ends of the cassette to permit the cassette to be suspended by the rail in a card index box or the like. The rail is provided with suitable releasable latch means to permit releasable latching of the rail to the cassette. In one embodiment, the end portions of each rail are provided with incisions to facilitate suspension of the rail on a wire frame.

5 Claims, 7 Drawing Figures

INVENTORS
FRANZ N. SPIROCH,
KARL HEINZ SCHMUCK
BY: Williamson, Palmatier & Bains
ATTORNEYS INVENTORS
FRANZ N. SPIROCH,
KARL HEINZ SCHMUCK
BY Williamson, Palmatier & Bains
ATTORNEYS

DEVICE FOR FACILITATING THE STORAGE OF MAGNETIC TAPE CASSETTTES

SUMMARY OF THE INVENTION

Cassettes for magnetic tapes are manufactured and marketed in a standard form agreed upon by the producers of such cassettes and suited to the recording equipment on sale. The cassettes each consist of two plastics half shells which enclose the winding spools for the magnetic means for carrying the recorded material, which means takes the form of a tape. The exterior shape of the cassette is that of an elongate rectangular, on one of the long edges of which the half shells are formed with openings through which the tape passes for the purpose of being tensioned and applied to the recording and play-back heads of the recording equipment. Hereinafter, the long edge of the cassette will be referred to as the "open" long edge. Except at the openings referred to, the tape is completely surrounded and protected by the half shells.

The cassettes are marketed in small boxes made of plastics material, and these boxes are also used for the dust-proof storage of the cassettes. The boxes can also carry written matter for identifying the material stored in the cassette.

Magnetic tape cassettes have been used not only for storing material for entertainment purposes, but are also being employed on an increasing scale in commercial fields for the storage of information, the recording of conversations and the like. There thus arises the need for providing cassette-storage means that is superior to the existing box systems as regards space occupied, stackability, ease of inspection and manufacturing costs.

The object of the invention is to provide a means for meeting these requirements. The invention is based on the knowledge that card-index systems are now generally used in offices, and this knowledge is applied to the present problem.

According to the present invention, there is provided a device for facilitating the storage of a magnetic tape cassette, the device consisting of a rail composed of a plastics material and being of substantially U-shaped cross-section, the dimensions of the rail being such that it can releasably grip the sides of a cassette when fitted over an edge thereof and portions of the rail extend from both ends of the cassette.

It will hereinafter be seen that the cassette, together with the rail in embodying the invention, takes the form of a suspended file, though of different dimensions. The cassette is protected by the rail against dust and damage at the only point where this is necessary, namely, where the tape is externally accessible. The rail can be produced very economically by normal manufacturing methods. It provides sufficient space for accommodating identifying written matter, the upper edge of the rail, remove from the open long edge of the cassette, being used with advantage for carrying the written matter, since this edge is the most readily visible when several cassettes fitted with rails are arranged in a card-index box. This edge can however be so formed that a normal index-card rider or the like can be fitted to it.

Each of the cassettes has raised surfaces which assist the operation of introducing into and locating the cassettes in the associated recording and play-back equipment. These raised surfaces or the recesses and openings which define them laterally can be advantageously used for latching the plastics rail fitted on to the cassette, so that the rail cannot be unintentionally displaced. The raised surfaces extend obliquely and inwardly towards the open long edge on the large faces of the cassette so that the provision of latching means on the plastics rail enables the rail to be secured on the cassette against movement in one direction in which the cassette may be pushed as well as in the direction transverse thereto, and the rail is only removable after the resilient holding force of the plastics material has been overcome. When stored in card-index boses, the cassettes hang from the latching means as will be described in greater detail hereinafter.

For the purpose of economising in material and space, the rail can be made narrower near the projecting ends, so that only that degree of rigidity is provided that is required for storing the cassette in a card-index box.

Cassettes with which the means embodying the invention are intended to be used, are described, for example, in the specification of German Pat. No. 1,191,978.

BRIEF DESCRIPTION OF THE FIGURES OF THE DRAWINGS

Embodiments of the invention will now be described in greater detail as examples, with reference to the accompanying drawings in which.

DETAILED DESCRIPTION OF THE INVENTION

Figure 1:
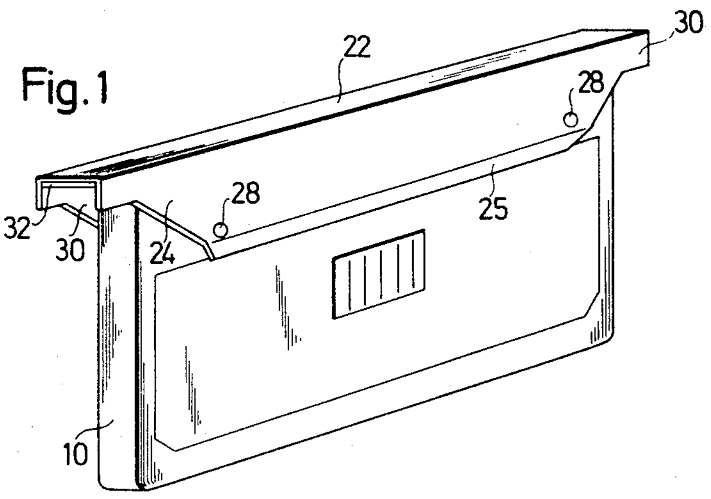
FIG. 1 is a perspective view of a cassette, provided with carrying means.
Figure 2:
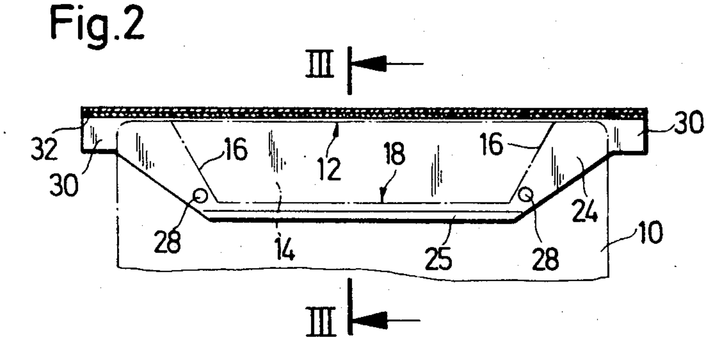
FIG. 2 illustrates the means in side elevation and party in section.
Figure 3:
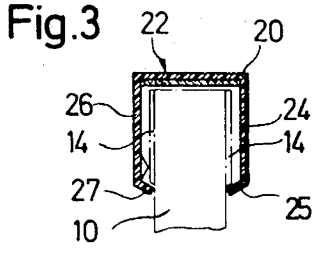
FIG. 3 is a cross-section on line III—III of FIG. 2.

Referring now to the drawings, FIGS. 1, 2 and 3 show the exterior shape of a cassette 10, which is substantially that of a rectangular, elongate block of low height. Magnetic tape housed within the cassette is accessible from the exterior at one of the long edges which is formed with tape access apertures. Extending from the edge 12 and on both faces of the cassette are raised surfaces 14 which are defined by obliquely and inwardly extending edges 16 and a lower edge 18. The purpose of the invention is to protect the edge 12.

In carrying out the invention, there is provided a rail 20 of resilient plastics material, for example, polyvinyl chloride or polystyrene, which rail has a U-shaped cross-section comprising a base portion or panel 22 and panels 24 and 26. Adjacent their free lower edges, the panels are bent over inwards to define inwardly turned flanges or lips 25, 27 so that they engage below the edges 18 of the raised surfaces 14 when the rail, as shown, is pushed on to the cassette. To prevent unintentional displacement of the rail on the cassette, indentations 28 are provided in the panels 24 and 26 to define nibs or projections at the inner surfaces of the panels, these indentations being located approximately at the lower end of the edges 16 when the rail is pushed on to the cassette. The free ends 30 of the rail project over the side edges of the cassette, and the panels 24 and 26 slope towards the free ends, so that the rail acquires the shape best seen in FIG. 1. The inner surface of the base 22, presented to the open long edge 12 of the cassette, can be provided with a strip 32 of felt or equivalent material, so as to close the openings in the cassette and to protect the magnetic tape against dust on this long edge.

Figure 3A:
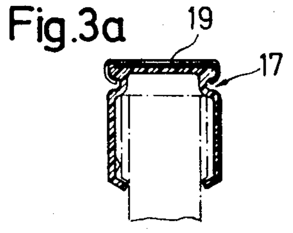
FIG. 3*a* is a partial cross-section similar to that of FIG. 3 but of a modified construction.

FIG. 3*a* shows a modified cross-sectional form of the means embodying the invention. Longitudinally-extending grooves 17 are provided approximately at the junctions between the base and panels, and the bent-back webs of a strip 19 of transparent material can be sprung or pushed into these grooves. The cassette can then be identified by means of a slip of paper which is pushed between the strip 19 and the outside of the base and which can be readily replaced.

Figure 4:
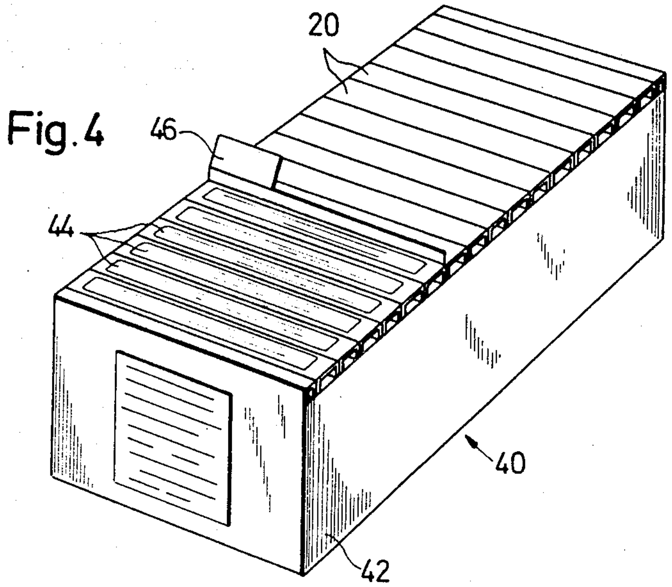
FIG. 4 is a perspective view of a card-index box having cassettes and their carrying means sotred therein.
Figures 5, 6:
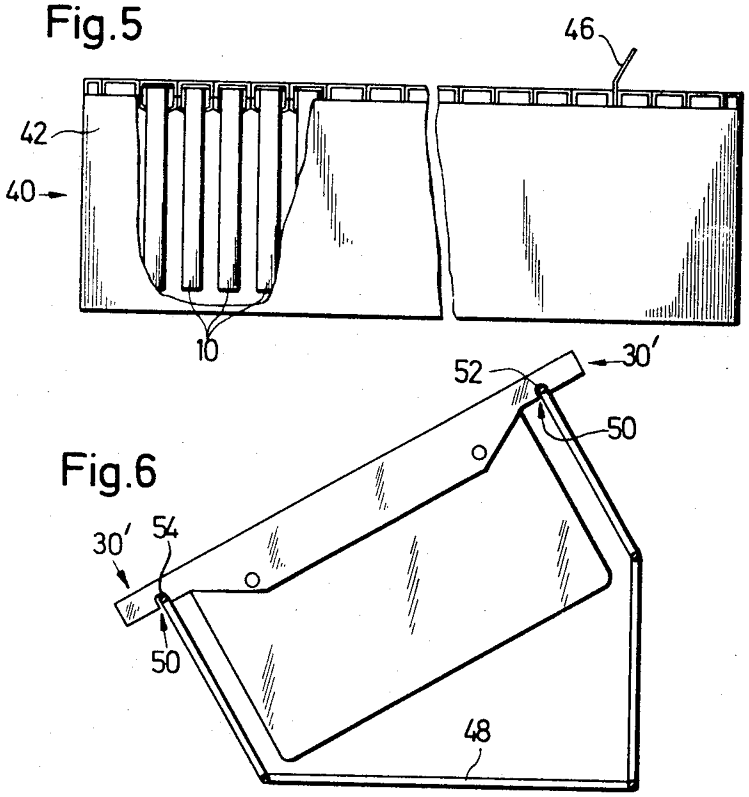
FIG. 5 is a side view, partly in section, of the card-index box shown in FIG. 4.
FIG. 6 is a schematic illustration of a frame in which the cassettes can be suspended when an appropriate form of cassette carrying means is used.

FIGS. 4 and 5 show how cassettes, provided with the plastics rail described can be arranged in a card-index box. The arrangement resembles that of a suspended file, the cassettes, suspended by the rails 20, being arranged on e behind the other in the card-index box 40. The projecting ends of the rails in turn rest on the walls 42 of the box 40. It will be seen from FIG. 4 that some of the rails are provided with a strip 44, for written matter, on that surface of the base 22 visible from above. Another rail is provided with a rider or a sleeve 46 for a label for carrying written matter. It can be seen that the rail embodying the invention enables the known filing means which have proved reliable in office-organization techniques to be applied in a similar way to the storage of magnetic tape cassettes.

FIG. 6 shows how storage of the cassettes can be effected in a particularly economical manner. The plastics rail contains incisions or notches 50 in the end portions 30', which are somewhat longer than in the construction shown in FIGS. 1 to 5, and the transverse stays 52 and 54 of a wire frame 48 fit into these incisions, there being slight play between the stays and the incisions. Thus, the cassettes are displaceable only laterally on the transverse stays. For the purpose of removal, all that is required is to apply pressure to the upper end portion 30', so that the rail, together with the cassette, can be swung about the upper transverse stay 52 and then readily removed.

It will be understood that the embodiment described can also be modified in other ways to suit the particular storage container or frame employed. Thus, instead of the simple incisions 50, curved incisions can be provided so that the rail can be suspended in the vertical position rather like the spine of a book.

What is claimed is:

1. A device facilitating the storage of a magnetic tape cassette comprising in combination a rail and tape cassette, the cassette having an upper open long edge through which access to the tape is obtained and having raised surfaces on the sides of the cassette adjacent the open long edge, the raised surfaces having lower edges and also having end edges spaced from the ends of the cassette and facing obliquely downwardly at obtuse angles with the lower edges, the rail composed of a plastics material and being of substantially U-shaped cross section receiving and confining the open long edge of the cassette and releasably and resiliently gripping the sides of the cassette, the rail extending beyond both ends of the cassette and having a top base panel overlying and closing the open long edge of the cassette to protect the tape from dust, debris and damage, the U-shaped rail also having resiliently flexible, but stiff depending side panels spaced from each other confronting and lying along the raised surfaces of the cassette, the side panels having longitudinally extending and inwardly turned flanges spaced well below said base panel underlying and engaging the lower edges of the raised surfaces thereby supporting the cassette, and the side panels having bottom edges adjacent both ends of the rail spaced below the base panel and above the flanges, the side panels and bottom edges extending endwise beyond the cassette to confine the cassette and facilitate suspension of the device and cassette from said bottom edges.

2. A device according to claim 1, in which the rail is provided with latching means for engagement with the cassette, said latching means including a nib in one of the side panels and projecting inwardly of the rail from said panel and toward the opposite side panel, said nib being spaced upwardly from the flange to confront and engage an obliquely downwardly facing end edge of the raised surface on the cassette and thereby restrict endwise movement of the cassette and rail relative to each other.

3. A device according to claim 1, in which the rail is formed with grooves for the accommodation of a transparent cover strip for the top outer surface of the rail.

4. A device according to claim 1, in which the end portions of the rail are formed with notches in said bottom edges of the side panels to facilitate suspension of the rail on a wire frame.

5. A device according to claim 4, in which the form of the notches and the wire frame are such as to permit the storage of the cassette in an inclined or a vertical position.

* * * * *